US008477670B2

(12) United States Patent
Sumida et al.

(10) Patent No.: US 8,477,670 B2
(45) Date of Patent: Jul. 2, 2013

(54) WIRELESS COMMUNICATION METHOD FOR WIRELESS LAN SYSTEM, WIRELESS COMMUNICATION DEVICE AND WIRELESS TERMINAL

(75) Inventors: Haruhiko Sumida, Kawasaki (JP); Teruo Kawahara, Kawasaki (JP)

(73) Assignee: NEC Infrontia Corporation, Kanagawa (JP)

( * ) Notice: Subject to any disclaimer, the term of this patent is extended or adjusted under 35 U.S.C. 154(b) by 593 days.

(21) Appl. No.: 12/718,728

(22) Filed: Mar. 5, 2010

(65) Prior Publication Data

US 2010/0226299 A1 Sep. 9, 2010

(30) Foreign Application Priority Data

Mar. 6, 2009  (JP) .................. 2009-053506
Mar. 24, 2009 (JP) .................. 2009-071843

(51) Int. Cl.
H04W 52/02 (2009.01)
H04W 84/12 (2009.01)

(52) U.S. Cl.
USPC ....................... 370/311; 455/343.2

(58) Field of Classification Search
CPC .............. H04W 52/02; H04W 84/12
USPC ....................... 370/311; 455/343.2
See application file for complete search history.

(56) References Cited

U.S. PATENT DOCUMENTS

| 7,505,795 | B1* | 3/2009 | Lim et al. ............ 455/574 |
| 2007/0130249 | A1* | 6/2007 | Kang ................. 709/202 |
| 2007/0213101 | A1* | 9/2007 | Oh et al. ............ 455/572 |
| 2008/0049703 | A1* | 2/2008 | Kneckt et al. ........ 370/342 |

FOREIGN PATENT DOCUMENTS

| JP | 62-053549 A | 3/1987 |
| JP | 63-301627 A | 12/1988 |
| JP | 9-8879 A | 1/1997 |
| JP | 9-162798 A | 6/1997 |
| JP | 2003-179539 A | 6/2003 |
| JP | 2004-128949 A | 4/2004 |
| JP | 2004-134904 A | 4/2004 |
| JP | 2004-187002 A | 7/2004 |
| JP | 2005-057602 A | 3/2005 |
| JP | 2006-238320 A | 9/2006 |
| JP | 2006-246121 A | 9/2006 |
| JP | 2006-295370 A | 10/2006 |
| JP | 2007-96898 A | 4/2007 |
| JP | 2008-193272 A | 8/2008 |

OTHER PUBLICATIONS

"Wireless LAN Medium Access Control (MAC) and Physical Layer (PHY) Specifications; 11.2 Power management", IEEE Computer Society, Jun. 12, 2007, pp. 425-427, IEEE Std 802.11™-2007, Part 11.2.

* cited by examiner

Primary Examiner — Ayaz Sheikh
Assistant Examiner — Tarell Hampton
(74) Attorney, Agent, or Firm — Sughrue Mion, PLLC

(57) ABSTRACT

In a wireless communication method of a wireless communication device to which a power management mode of a wireless LAN is applied and to which a parent device communicates, the method includes updating a listen interval of receiving a beacon signal from a parent device to be shorter than a current listen interval in response to a data transmission to the parent device; and periodically increasing the updated listen interval between the time span from the data transmission to a next data transmission, wherein reception of the beacon signal is carried out after switching from a doze state to an awake state.

11 Claims, 8 Drawing Sheets

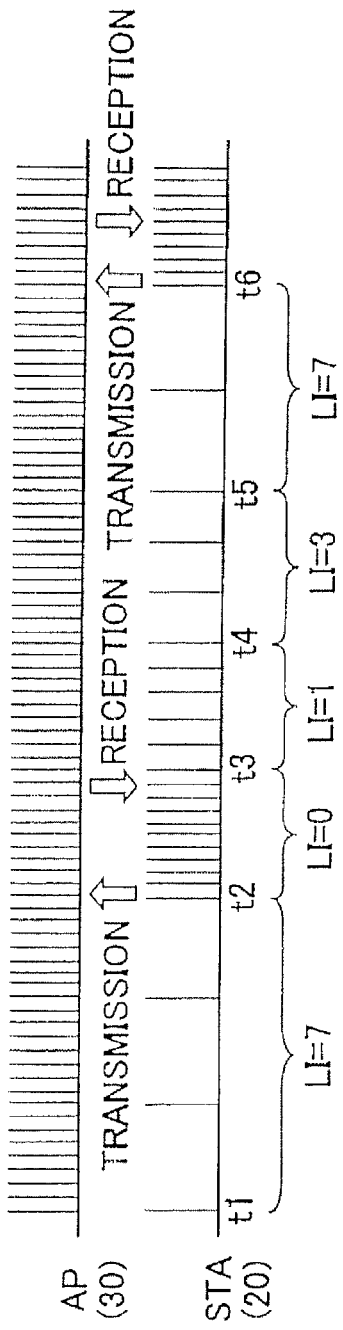

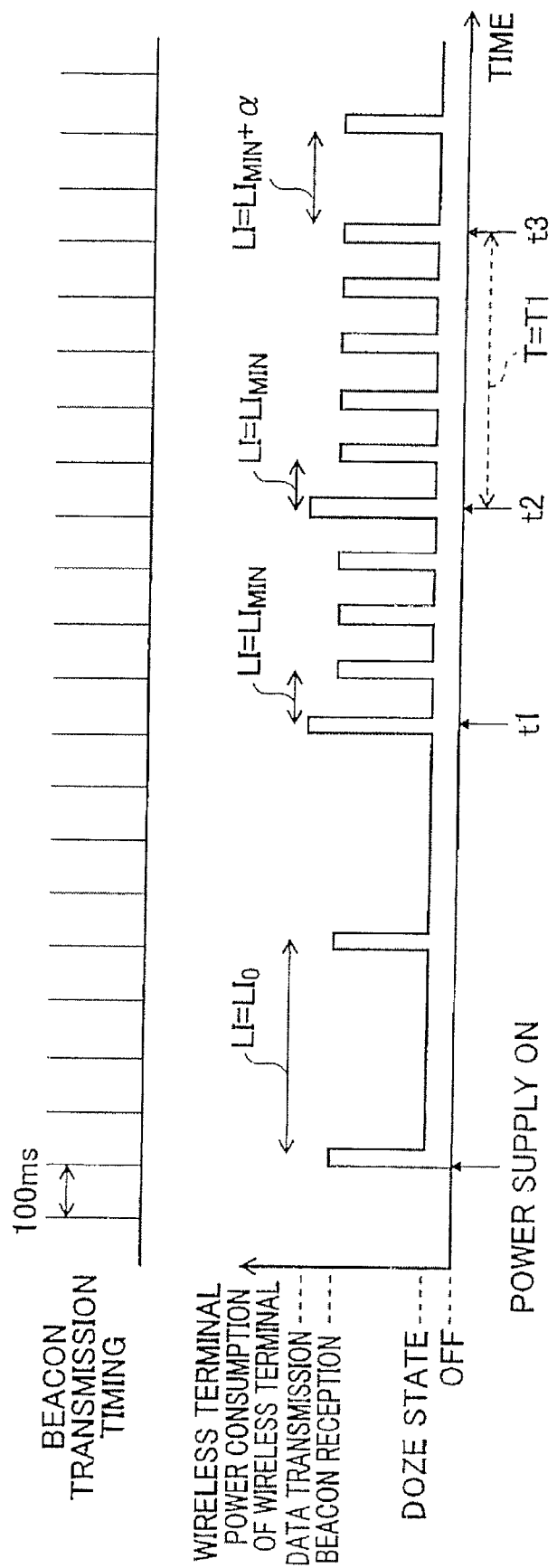

WIRELESS COMMUNICATION METHOD FOR WIRELESS LAN SYSTEM, WIRELESS COMMUNICATION DEVICE AND WIRELESS TERMINAL

CROSS REFERENCE TO RELATED APPLICATIONS

The present application claims the benefit of Japanese Patent Application No. 2009-053506, filed Mar. 6, 2009 and Japanese Patent Application No. 2009-071843, filed Mar. 24, 2009, which are hereby incorporated by reference in its entirety.

TECHNICAL FIELD

The present invention relates to a wireless communication method in a power management mode of a wireless LAN and a wireless communication device and a wireless terminal having a power management mode function.

BACKGROUND ART

Power management modes such as the one described in NPL 1, which will be described hereinafter, are known as techniques for suppressing the power consumption of a battery-driven wireless terminal for a wireless LAN. In a power management mode, such a wireless terminal maintains a doze state of operating at low power during waiting for communication and switches to an awake state from the doze state when communication becomes necessary. More specifically, in a power management mode, the wireless terminal switches from a doze state of operating at low power to an awake state of operating at power level that enables wireless communication or vice versa, utilizing a transmitted packet notification by means of beacon signals transmitted at regular intervals from an access point (to be referred to as "AP" hereinafter) operating as parent device. The transmitted packet notification is a traffic indicator map (TIM) or a delivery traffic indication message (DTIM).

The AP operating as parent device of the terminal periodically transmits a beacon signal and, when there is a data to be received by the terminal, sets a DTIM for the TIM of the beacon and transmits it at regular intervals. In a doze state, the terminal becomes awake at predetermined listen intervals and receives a beacon signal to check if there is a packet addressed to itself or not in the beacon signals. If there is a packet addressed to itself, the terminal executes a packet receiving process in the awake state and subsequently gets into a doze state.

The longer the listen interval, the better the power saving effect of the terminal. However, on the other hand, the possibility of occurrence of a packet reception delay rises. An example of reception delay will be described below by referring to FIG. 7 of the accompanying drawings. The upper part of FIG. 7 shows the timings for the AP to send out beacon signals and the lower part shows the timings of operation of the terminal side STA (e.g., wireless LAN card) that match the timings for the AP.

In this example, "2" is selected as listen interval. In other words, the STA receives every third beacon signal from the AP. As shown in FIG. 7, the STA awakes from a doze state at clock times t10, t11 and t13 with a listen interval of "2". Assume here that a packet addressed to the STA arrives at the AP at clock time t12. However, the STA is in a doze state at this clock time and hence cannot receive the packet. The packet that arrives at the AP is thereafter delivered to the STA at clock time t13 when the STA awakes. The time interval between the clock time t12 and the clock time t13 corresponds to the reception delay time of the STA. Such a reception delay at the STA can give rise to a communication delay.

Known techniques for minimizing such a reception delay include those described in PTLs 1 and 2, which will be described hereinafter. PTL 1 describes a method by which a base station (AP) determines the listen interval of each node according to the quantity of the packets transmitted to and accumulated in the base station. PTL 2 describes a method by which a wireless LAN client (STA) changes the listen interval according to the application to be executed.

{Citation List}
{Patent Literature}
{PTL 1} JP-A-2007-096898
{PTL 2} JP-A-2004-128949
{NPL 1} "IEEE Std 802. 11TM-2007: Wireless LAN Medium Access Control (MAC) and Physical Layer (PHY) Specifications; 11.2 Power management", IEEE Computer Society, Jun. 12, 2007

SUMMARY OF INVENTION

{Technical Problem}

With the method of the above-described PTL 1, the listen interval can be set up appropriately but the base station controls the operation of setup. Therefore, with this method, the processing load of the base station can easily increase and a novel problem of a fall of the throughput of the base station may occur.

With the method of the PTL 2, the terminal can select a listen interval that is suitable for the application to be executed. However, in general, the frequency of data reception can vary during the execution of an application. Therefore, the listen interval selected for the application may not match the actual interval of data reception by the application. A reception delay as described above occurs when the actual data reception interval becomes shorter than the listen interval selected for the application. Conversely, frequent awakening goes to waste and consequently reduces the power saving effect of the terminal when the actual data reception interval exceeds the expected interval.

This invention is to solve the above problem. An exemplary object of the present invention is to provide a technique of suppressing reception delay from a parent device, while saving power at a terminal operating in a power management mode.

{Solution to Problem}

In a wireless communication method of a wireless communication device to which a power management mode of a wireless LAN is applied and to which a parent device communicates, the method according to the present invention includes:

updating a listen interval of receiving a beacon signal from a parent device to be shorter than a current listen interval in response to a data transmission to the parent device; and periodically increasing the updated listen interval between the time span from the data transmission to a next data transmission, wherein reception of the beacon signal is carried out after switching from a doze state to an awake state.

A wireless communication device according to the present invention includes:

a communication section that conducts wireless communications with a parent device of a wireless LAN in a power management mode; and a communication control section that stores an information table defining three or more levels of interval of receiving a beacon signal from the parent device after switching from a doze state to an awake state, updates the current listen interval to a shorter listen interval according to the information table in response to a data transmission to the parent device and periodically increases the updated listen interval to follow the levels of the information table.

A wireless communication device according to the present invention includes:

a communication section that conducts wireless communications with a parent device of a wireless LAN in a power management mode; and a control section that updates the interval of receiving a beacon signal from the parent device after switching from a doze state to an awake state to a value not greater than the beacon transmission interval of the parent device in response to a data transmission to the parent device and increments the interval of receiving a beacon signal by a defined value each time when a defined time passes between the time span from the data transmission to a next data transmission.

{Advantageous Effects of Invention}

Thus, according to the present invention, it is possible to suppress reception delay from a parent device, while saving power at a wireless communication device operating as a terminal adapted to operate in a power management mode.

BRIEF DESCRIPTION OF DRAWINGS

{FIG. 3} An illustration of selection of a listen interval in the first exemplary embodiment of the present invention.

{FIG. 4} An illustration of a specific example in the first exemplary embodiment of the present invention.

{FIG. 10} An illustration of a specific example in the second exemplary embodiment of the present invention.

DESCRIPTION OF EMBODIMENTS (First Exemplary Embodiment)

Figure 1:
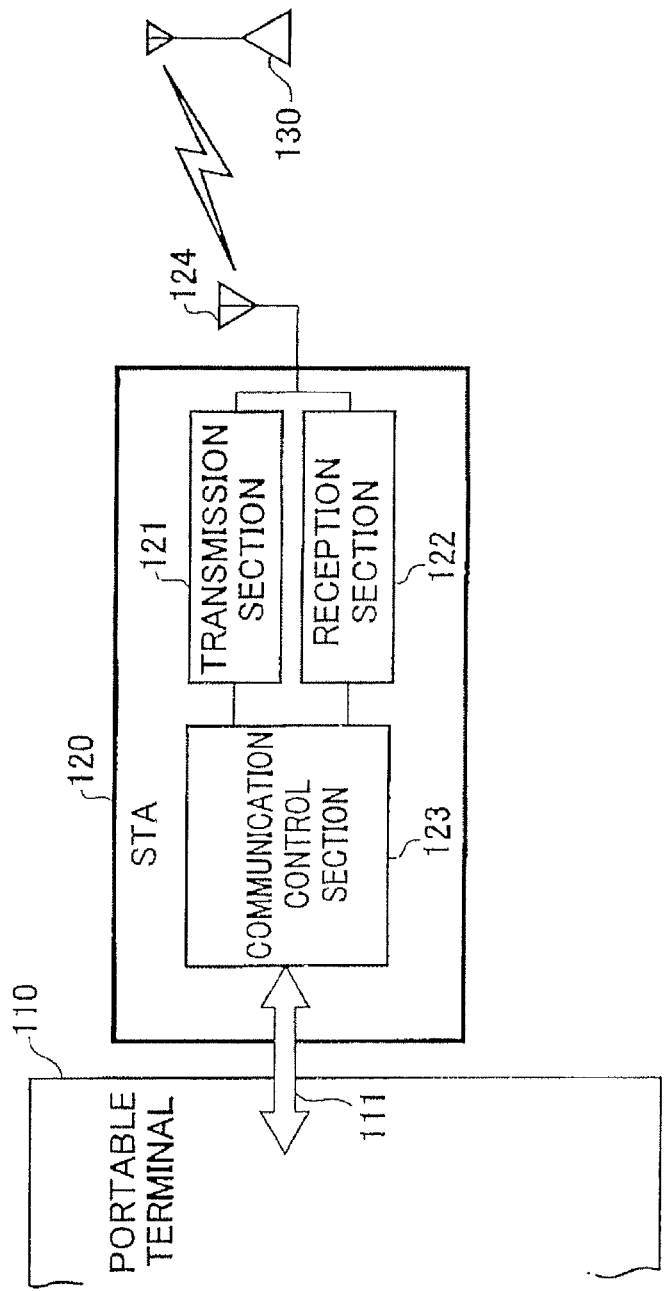
{FIG. 1} A block diagram of a first exemplary embodiment of the present invention, showing the configuration thereof.

FIG. 1 shows the configuration of a first exemplary embodiment of the present invention. Wireless LAN card (to be referred to as "STA" hereinafter) 120 that corresponds to a wireless communication device according to the present invention is a device adapted to a power management mode of wireless LAN as defined in the above-described NPL 1 and connected to a portable terminal 110 through a communication bus 111. AP 130 is a parent device that transmits a beacon signal at constant intervals.

As shown in FIG. 1, the STA 120 includes a transmission section 121, a reception section 122, a communication control section 123 and an antenna 124. The transmission section 121 transmits wireless signals to the AP 130 by way of the antenna 124. The reception section 122 receives wireless signals from the AP 130 by way of the antenna 124. The communication control section 123 controls the wireless communication with the AP 130 by a control signal supplied from the portable terminal 110 through the communication bus 111.

The communication control section 123 detects the transmission timing of the beacon signal from the AP 130 and counts the number of times of the detection. Then, the communication control section 123 controls the update of the beacon listen interval, using the counted number of times. For this purpose, the communication control section 123 has counter C1 and counter C2 which are incremented in time with the transmission timing of a beacon signal. The counter C1 is employed to measure the timing of Awake that is based on the current listen interval. The counter C2 is employed to measure the time elapsed since the transmission section 121 transmitted data to the AP 130.

The communication control section 121 has an information table that defines the values to be applied as the current listen interval. The table defines three or more levels as values from a minimum value to a maximum value of listen interval. As will be described hereinafter, the levels are altered according to the reading of the counter C2.

Figure 2:
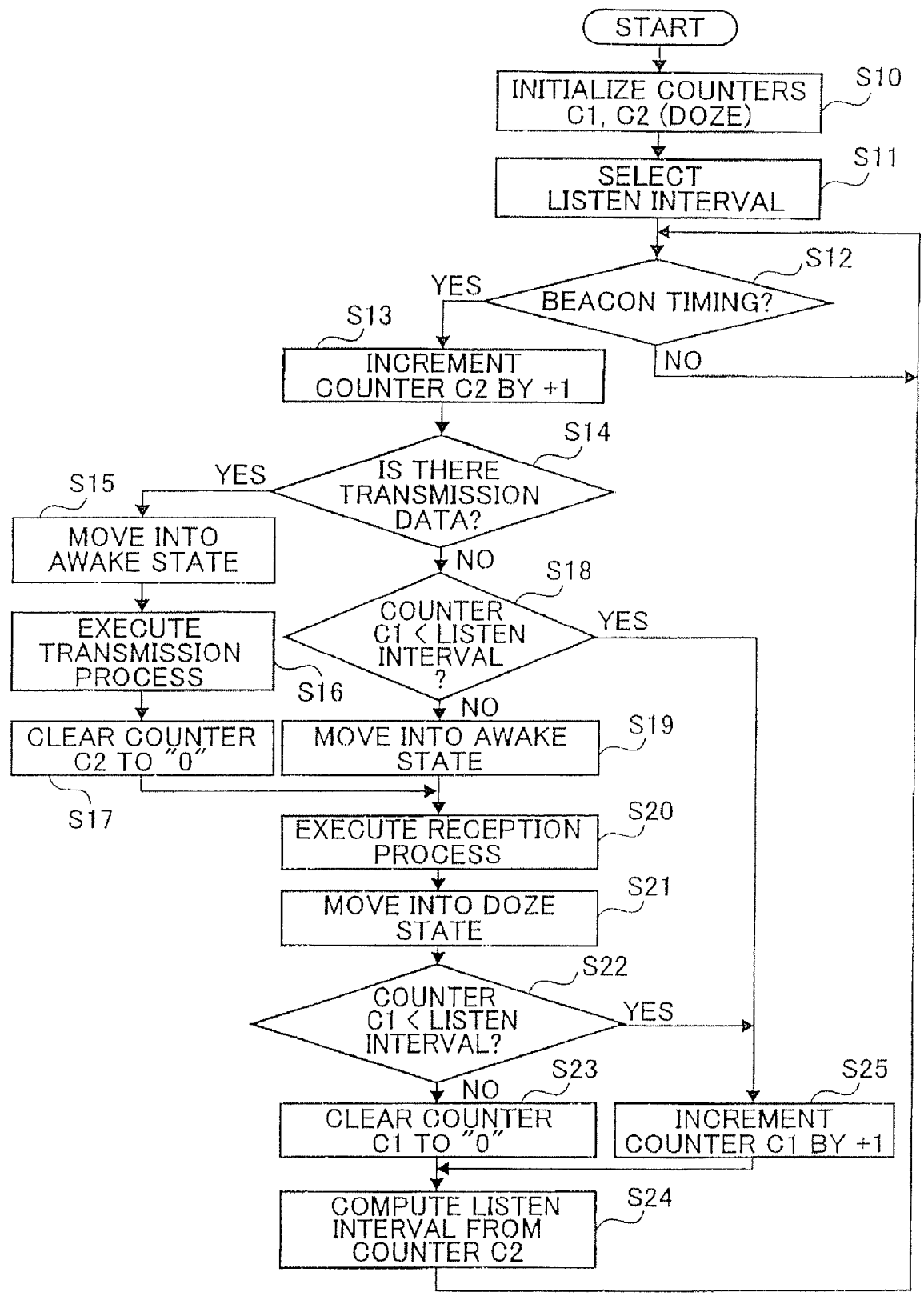
{FIG. 2} A flowchart showing the operation sequence of the first exemplary embodiment of the present invention.

The operation of the STA 120 of this embodiment will be described by referring to the flowchart shown in FIG. 2. As the STA 120 is connected to the AP 130 to go into a power management mode, the STA 120 gets into a dose state and initializes the counters C1 and C2 to zero (Step S10). Additionally, the STA 120 sets the listen interval to be used from then on (Step S11). The maximum value on the above-described table may typically be applied to the listen interval in this initial stage.

The STA 120 waits for the transmission timing of a beacon from the AP 130, using an internal timer (Step S12) and, as the transmission timing comes, the STA 120 increments the counter C2 by +1 (Step S13). If there is data in a transmission standby status for the AP 130 (Step S14: Yes), the STA 120 moves from the doze state into an awake state (Step S15) and executes a data transmission process (Step S16).

As the STA 120 completes the data transmission, the STA 120 reduces the reading of the counter C2 to zero (Step S17). In this way, the counter C2 is initialized to zero at each time of data transmission to the AP 130 and, after the initialization, the counter C2 is incremented by 1 each time a beacon signal transmission timing comes. After the data transmission, the STA 120 maintains the awake state and executes a process of receiving beacon signals and data from the AP 130 (Step S20). Then, the STA 120 goes back into a doze state to suppress its power consumption.

If, on the other hand, there is not any data in a transmission standby status at the beacon transmission timing (Step S14: No), the STA 120 compares the reading of the counter C1 and the current listen interval in order to confirm whether the timing for going into an awake state from the doze state has come or not. If the reading of the counter C1 is found to be smaller as a result of the comparison (Step S18: Yes), the STA 120 determines that the timing for going into an awake state has not come yet. In this case, the STA 120 neglects reception of any beacon signal from the AP 130 and increments the counter C1 by +1 (Step S25). If, on the other hand, the reading of the counter C1 gets to the value of the listen interval (Step S18: No), the STA 120 goes into an awake state from the doze state and executes a reception process (Steps S19, S20). When the reception process is completed, the STA 120 switches to a doze state in order to suppress its power consumption (Step S21).

If the reading of the counter C1 has not reached the listen interval after moving into a doze sate (Step S22: Yes), the STA 120 determines that it is in a situation where it has executed a reception process, following a transmission process (Steps S16 through S20) and the advent of a beacon transmission timing (Step S12: Yes) has not been counted yet. In this case, the STA 120 increments the counter C1 by +1 (Step S25).

If, on the other hand, the counter C1 has reached the value of the listen interval after getting into a doze state (Step S22: No), the STA 120 determines that it is in a situation where the listen interval has passed (Step S18: No) and clears the counter C1 to zero (Step S23). In this way, the counter C1 is initialized each time when a listen interval passes.

As the STA 120 treats the counter C1 as described above, the STA 120 selects the listen interval that corresponds to the reading of the counter C2 from the above-described table of listen intervals and updates the current listen interval to the selected listen interval (Step S24). Then, the STA 120 executes the process from Step S12 on according to the updated listen interval.

FIG. 3 shows an exemplar table of listen intervals. Four levels are defined for listen intervals in the illustrated table. The listen intervals indicate the numbers of times by which reception of a beacon signal is neglected. For example, listen interval "3" means that the STA 120 neglects reception of three consecutive beacon signals after moving into a doze state and awakes at and receives the fourth beacon. On the other hand, listen interval "0" means that the STA 120 does not neglect any reception of beacon. In other words, the STA 120 awakes at each beacon transmission timing and receives all the transmitted beacons.

In the illustrated table, the minimum value of "0" is defined for the listen interval with regard to the range of "0 through 9" of the counter C2 and "1" is defined for the listen interval with regard to the range of "10 through 19", whereas "3" is defined for the listen interval with regard to the range of "20 through 29" and a maximum value of "7" is defined for the listen interval with regard to "30 or more" of the counter C2. In this way, levels are defined in such a way that the listen interval is gradually increased as the reading of the counter C2 rises. Note that the table shown in FIG. 3 is only an example and the number of levels of listen interval and the numerical values of each level can be appropriately selected and are not limited to those shown in the drawing.

Now, referring to FIG. 4, a specific example of control of the listen interval using the above-described table of FIG. 3 will be described below. The waveform in the upper part of FIG. 4 shows beacon transmission timings of AP 130 and the lower part shows the timings at which the STA 120 awakes and executes a reception process by referring to the timings of the upper part.

Assume that the listen interval of the STA 120 takes the maximum value of "7" at clock time t1 (LI=7). The STA 120 whose listen interval is "7" awakes from a doze state so as to receive every 7th beacon from the AP 130.

Assume now that the STA 120 transmits data to the AP 130 at subsequent clock time t2. As the counter C2 is initialized to zero by this, the STA 120 updates the listen interval to the minimum value of "0" from the current listen interval "7" (LI=0). The STA 120 whose listen interval is "0" receives each and every beacon signal from the AP 130 because the STA 120 starts to operate at each beacon transmission timing. Additionally, the counter C2 is incremented by +1 at each beacon transmission timing.

Thereafter, the STA 120 updates the listen interval to "1" from the current listen interval "0" (LI=1) if the counter C2 gets to "10" at clock time t3 without transmitting any data. This means that the counter C2 shifts from the current level of "0 through 9" to the level of "10 through 19" shown in FIG. 3. The STA 120 whose listen interval is "1" awakes from a doze state so as to receive every other beacon signal.

Thereafter, the STA 120 repeats alternatively a doze state and an awake state without transmitting any data and as the counter C2 gets to "20" at clock time t4, the STA 120 updates the listen interval to "3" from the current listen interval "1" (LI=3) according to the definition of the table (FIG. 3). The STA 120 whose listen interval is "3" receives every fourth beacon signal.

Further thereafter, if the STA 120 does not transmit any data and the counter C2 gets to "32" at clock time t5, the STA 120 updates the listen interval to the maximum value of "7" from the current listen interval "3" (LI=7). The listen interval that has now got to the maximum value is held to the maximum value of "7" thereafter unless an additional (next) data transmission takes place.

Assume here that the STA 120 that has been operating at listen interval "7" from the clock time t5 operates for data transmission again at clock time t6. As the counter C2 is initialized to zero once again in response, the STA 120 updates the listen interval to the minimum value of "0" from the current listen interval "7". Then, the STA 120 awakes to receive each and every beacon signal from the AP 130.

Thus, since this embodiment controls the current listen interval so as to be reduced to the minimum value in response to a data transmission of the STA 120, the STA 120 can receive any data that is expected from the AP 130 thereafter without delay. Additionally, since this embodiment subsequently controls the listen interval so as to be increased gradually as time elapses, the STA 120 can maintain the power saving effect without preventing any reception delay.

(Another Operation Sequence}

While the above-described operation sequence updates the listen interval to shorten the current listen interval in response to a data transmission to the AP 130, a data reception from the AP 130 may be additionally be used for the update. The operation of the STA 120 in such a case will be described by referring to the flowchart of FIG. 5. Note that only the difference between this operation sequence and the above-described operation sequence will be described below and what is common to the two embodiment will not be described any further.

The STA 120 of this operation sequence measures not only the time elapsed since a data transmission but also the time elapsed since a data reception by means of the counter C2. For this purpose, the following sequence is added to the sequence of the above-described operation sequence (FIG. 2).

Figure 5:
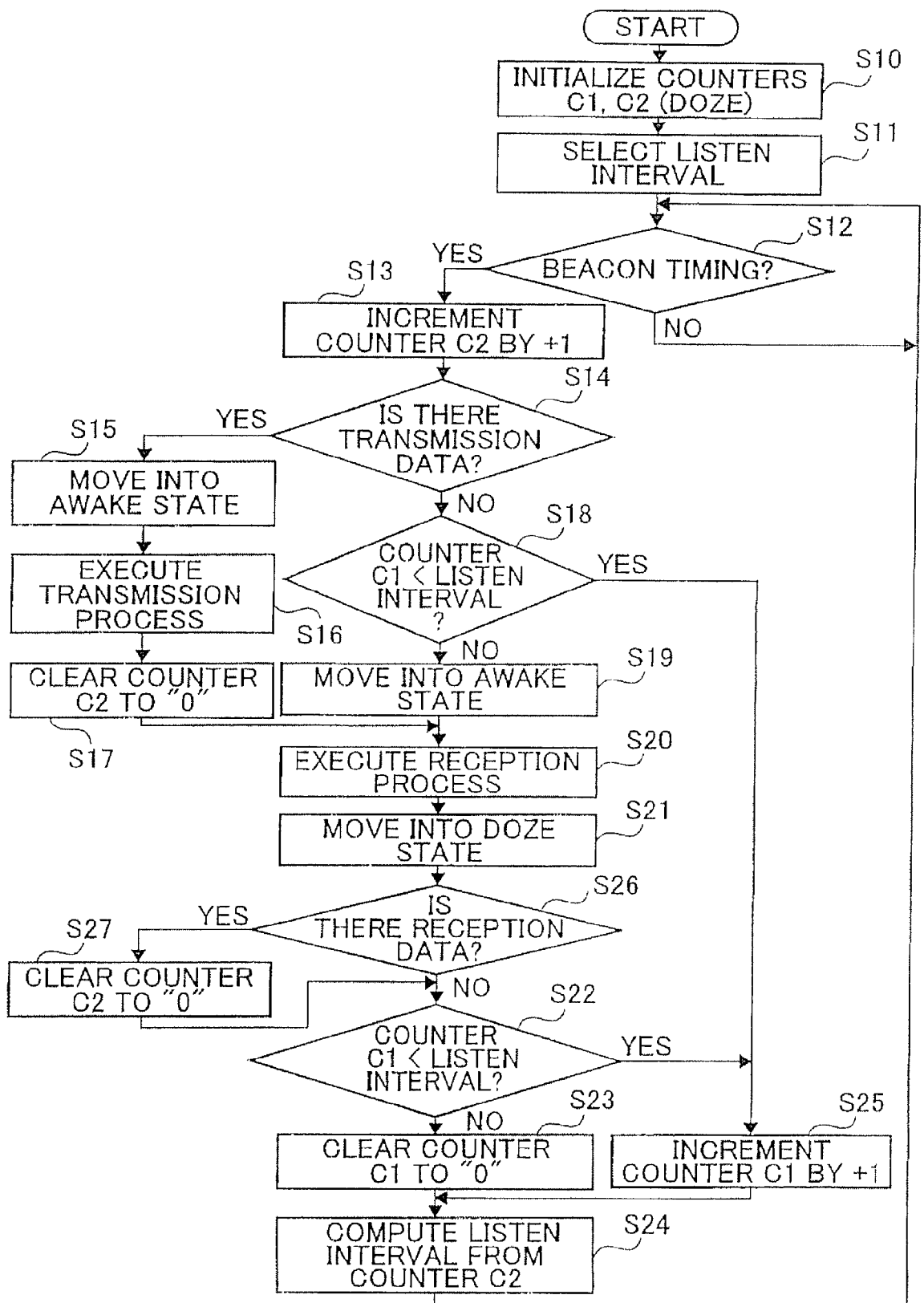
{FIG. 5} A flowchart showing another operation sequence of the first exemplary embodiment of the present invention.

As the STA 120 awakes once from a doze state to execute a transmission process and a reception process and goes back into a dose state (FIG. 5: Step S21), the STA 120 checks if a process of receiving the data accumulated in the AP 130 has been executed or not (Step S26). If the STA 120 has done an operation of data reception, the STA 120 reduces the current reading of the counter C2 to zero (Step S27). By doing so, the STA 120 counts not only the time elapsed since a data transmission but also the time elapsed since a data reception by the counter C2.

Figure 6:
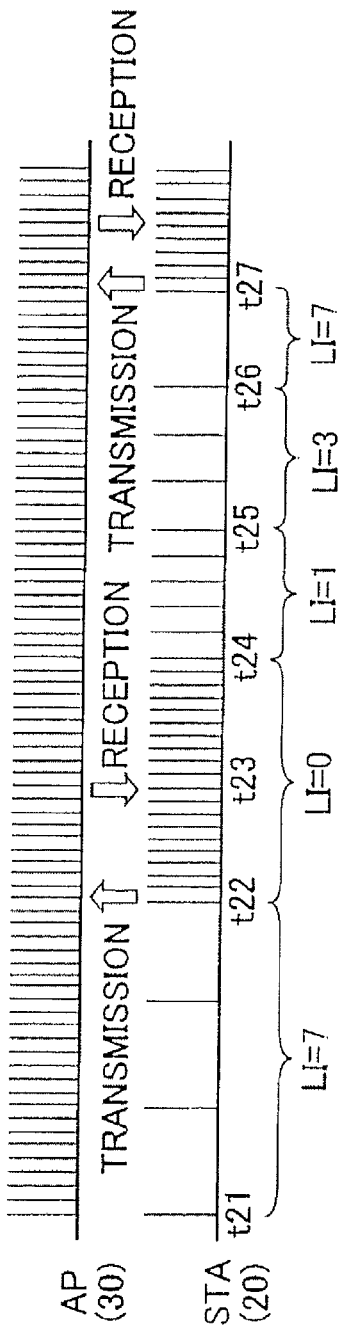
{FIG. 6} An illustration of a specific example in the another operation sequence of the first exemplary embodiment of the present invention.
Figure 7:
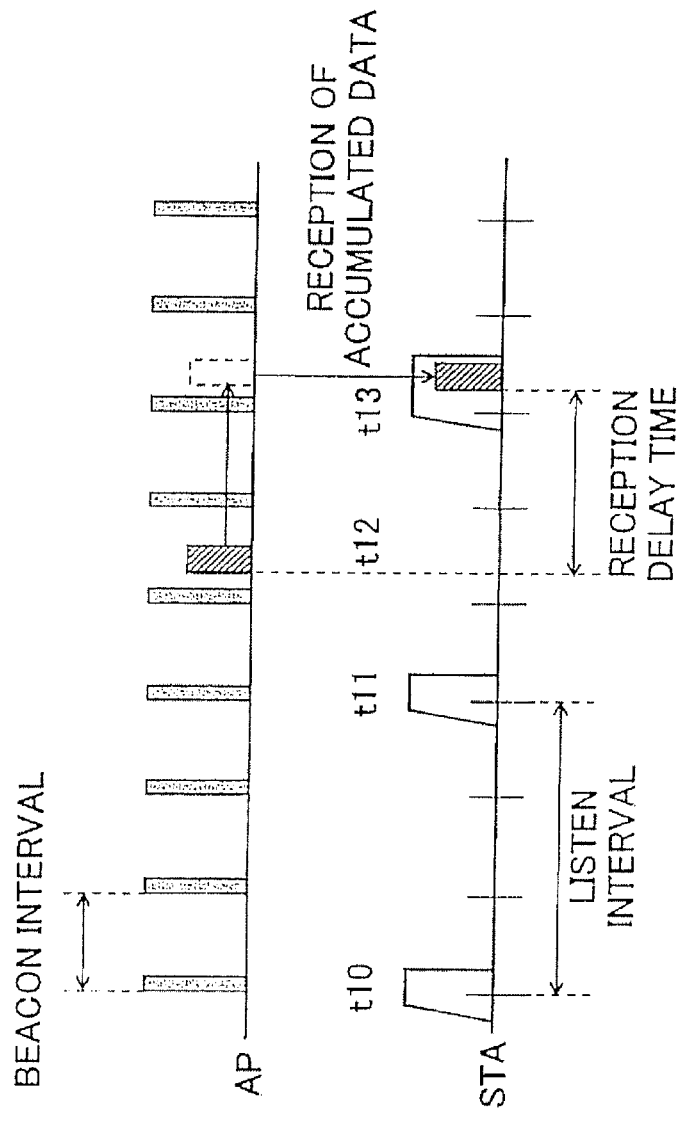
{FIG. 7} An illustration of reception delay in a power management mode of a wireless LAN.

FIG. 6 illustrates a specific example of this operation sequence. In the illustrated example, the listen interval is controlled according to the table shown in FIG. 3 like the example of FIG. 4. Referring to FIG. 6, as the STA 120 that operates at a listen interval of "7" (LI=7) from clock time t21 executes a data transmission process at clock time t22, the counter C2 is initialized and, at the same time, the listen interval is updated to the minimum value of "0" (LI=0).

Assume that the STA 120 detects the data reception from the AP 130 at clock time t23 before the counter C2 get to "10" after the initialization. Then, the STA 120 reduces the counter C2 to zero in response to the data reception. As a result, the listen interval is held to "LI=0" from clock time t23 on. Thereafter, the listen interval is updated to show a gradual increase of "LI=0" to "LI=1", "LI=1" to "LI=3", and "LI=3" to "LI=7" because there is neither "data transmission" nor "data reception" until clock time t27.

Thus, this operation sequence controls the STA 120 so as to change the listen interval to the minimum value not only in response to a data transmission but also to a data reception. As a result, a communication pattern where a reception of a large volume of data occurs in response to a transmission of a small volume of data to the AP 130 can be flexibly handled.

The present invention is by no means limited to the above-described embodiment, which may be altered and modified appropriately within the scope of the appended claims. When the listen interval is updated in response to a data transmission or a data reception, the listen interval is reduced to zero in the above-described embodiments. However, the value to be taken after such an update is not limited to zero, as long as the value is smaller than the current listen interval. More specifically, if the current listen interval is "7" from FIG. 3, for example, the current listen interval may alternatively be updated to "3" which is a rank lower than "7" or to "1" which is two ranks lower than "7". In such a case, then, the counter C2 is not cleared to zero but reduced by an intended rank or intended ranks in response to a data transmission or a data reception. If, for example, the counter C2 is "30" (LI=7) and the listen interval is reduced by a rank (LI=3), the counter C2 may be reduced from "30" to a value among "20 through 29".

The above-described technique of alternating the listen interval may be applied differently to data transmissions and data receptions. For example, it may be so arranged that the current listen interval is updated to the minimum value (LI=0) in response to a data transmission but the current listen interval is reduced by a rank in response to a data reception.

While the time elapsed since a data transmission or a data reception is measured by the counter C2 in the above-described embodiments, some other means such as another internal timer that is not synchronized with the beacon timing of the AP 130 may be used to measure the elapsed time. In such a case, it is desirable to provide a table like the one shown in FIG. 3 where the time elapsed since a data transmission and the time elapsed since a data reception are associated with listen intervals.

The wireless communication device of the present embodiment can be constituted with dedicated ICs or devices. However, the present embodiment can be carried out in the form of a computer program that can accommodate the processing of the wireless communication device (STA 120) and also in the form of a recording medium storing such a program.

(Second Exemplary Embodiment)

Figure 8:
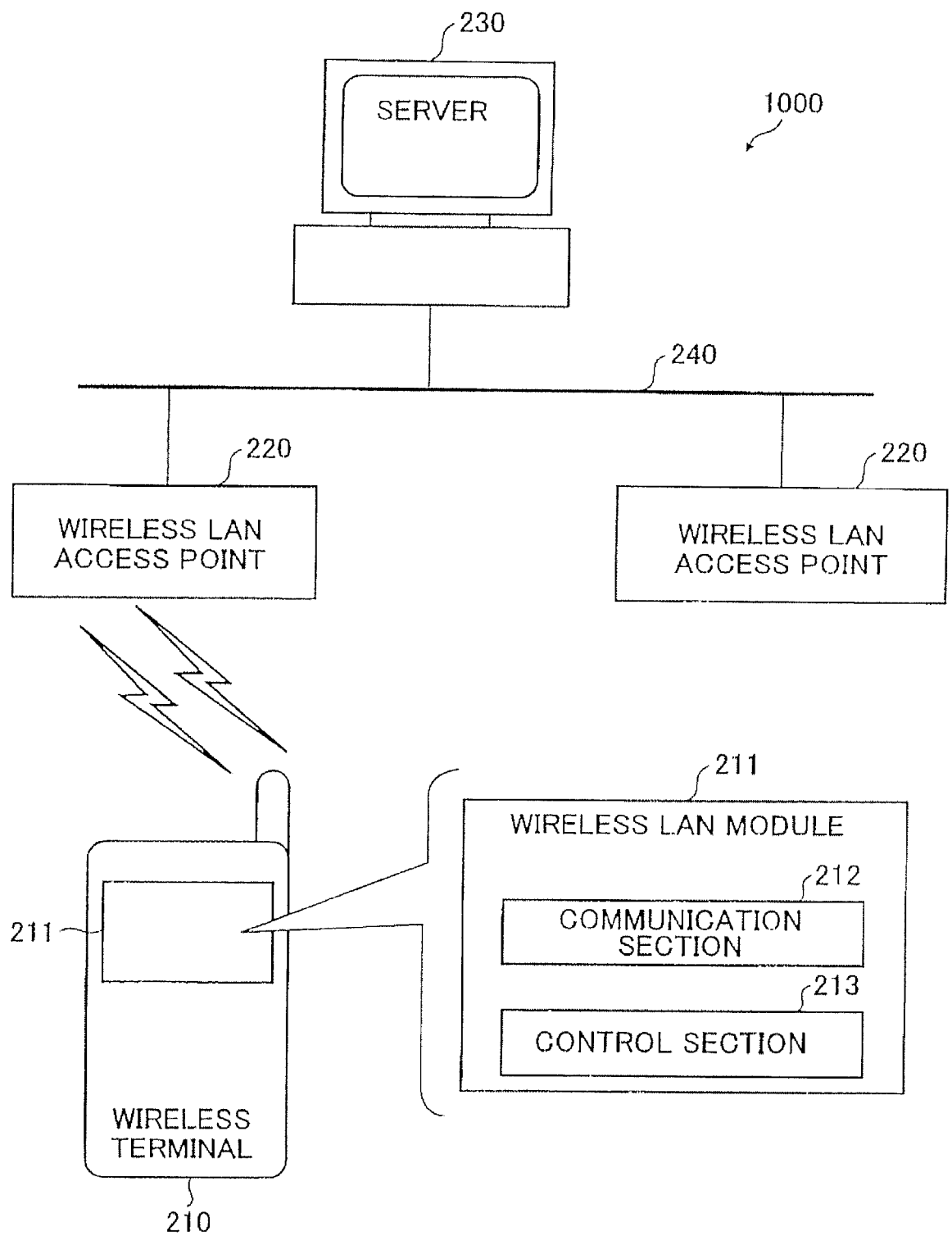
{FIG. 8} A block diagram of a wireless LAN system in a second exemplary embodiment of the present invention.

FIG. 8 shows the configuration of a wireless LAN system 1000 according to second exemplary embodiment of the present invention. The wireless LAN system 1000 includes a wireless terminal 210, access points 220 and a server 230, the access points 220 and the server 230 being connected to a wired LAN 240. In the wireless LAN system 1000, the wireless terminal 210 accesses the server 230 by way of one of the access points 220 by means of wireless LAN communication.

The wireless terminal 210 has a wireless LAN module 211 that can operates in a power management mode described in the above NPL 1. The communication section 212 of the wireless LAN module 211 is in charge of wireless communications in a power management mode with regard to the access points 220. The control section 213 is in charge of controlling the listen interval of beacon signal and controlling switching of the state (doze or awake) of the wireless terminal 210.

Figure 9:
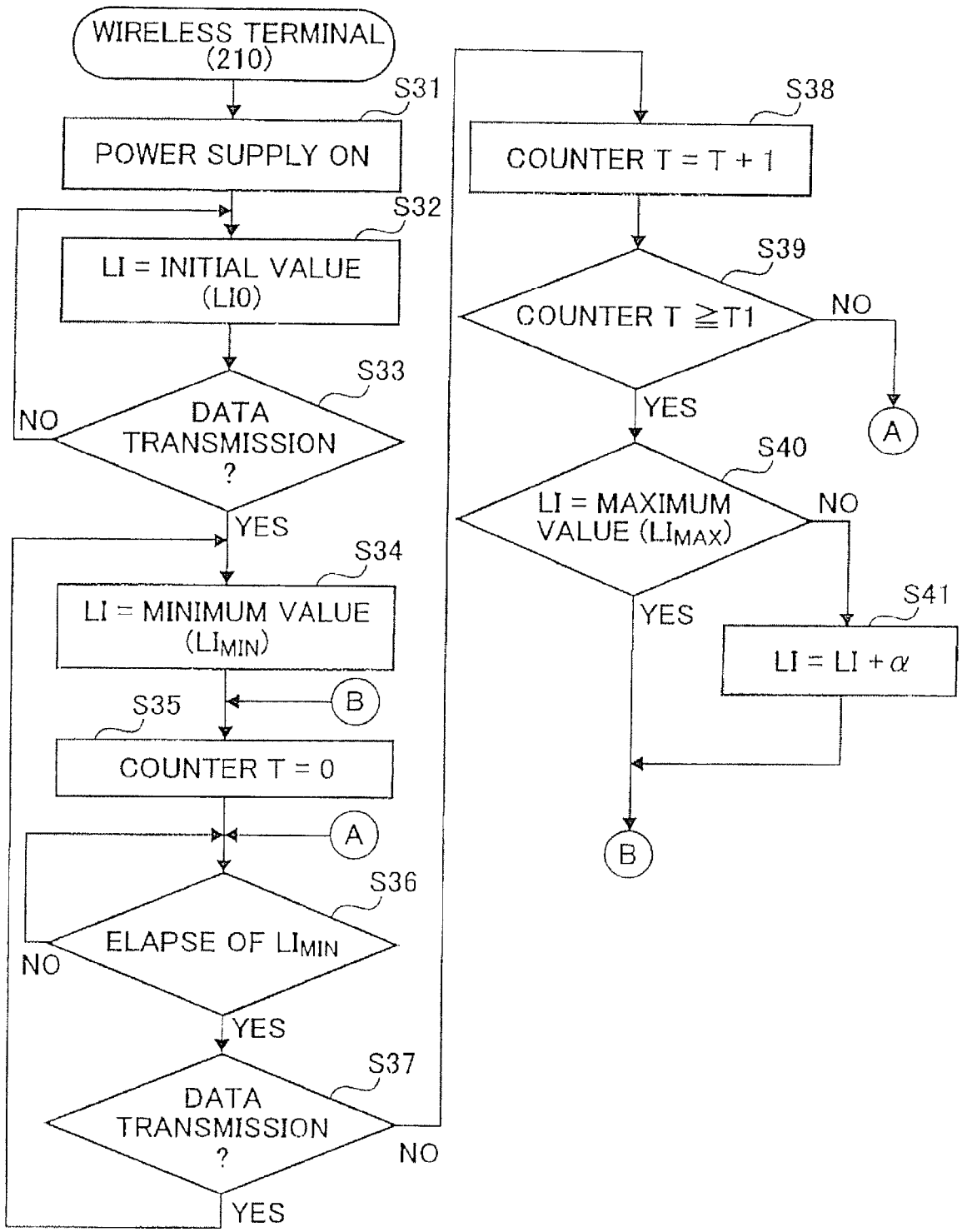
{FIG. 9} A flowchart of a wireless terminal in the second exemplary embodiment of the present invention.

The process of controlling the beacon listen interval of the wireless terminal 210 will be described below by referring the flowchart of FIG. 9. Firstly, the initial value (LI0), a minimum value (LImin) and a maximum value (LImax) for the beacon listen interval, the time span (T1) for a shift of listen interval and the increment value ($\alpha$) of listen interval are registered in advance in the wireless terminal 210.

A value same as the beacon transmission interval of the access points 220 or a value smaller than that is provided as minimum value of listen interval. Any value between the minimum value and the maximum value can be selected for the initial value of listen interval. For example, a value to be equal to the maximum value may be selected for the initial value of listen interval. A value that the counter T can indicate as will be described hereinafter is provided as the time span for a shift of listen interval. A value same as the minimum value or a value integer times thereof is provided as the increment value of listen interval.

As power is supplied (Step S31), the wireless terminal 210 reads out the registered initial value of listen interval and applies it as the current listen interval (Step S32). The wireless terminal 210 returns from a doze state at an interval of the initial value and receives a beacon signal from one of the access points 220. In the meantime, the wireless terminal 210 detects whether the itself operated for a data transmission to the access point 220 or not (Step S33).

If the wireless terminal 210 has operated for a data transmission to the access point 220, the wireless terminal 210 updates the listen interval from the initial value to the minimum value (Step S34). Additionally, the wireless terminal 210 initializes the counter T for measuring the time elapsed since the data transmission (Step S35). In this embodiment, the time elapsed from a data transmission is measured by means of the counter T on the basis of the minimum unit of listen interval. A timer for incrementing the counter T is provided in addition to the timer for measuring the current beacon listen interval.

The wireless terminal 210 monitors whether the timer of the counter T has completed its operation or not and hence whether the minimum value (LImin) of listen interval has elapsed or not (Step S36). If the time span has elapsed, the wireless terminal 210 gets back from a doze state and receives a beacon. If the wireless terminal 210 operates for a data transmission to the access point 220 at this time (Step S37: Yes), the listen interval is held to the minimum value (Step S34).

If there is not any data transmission when the timer of the counter T completed its operation (Step S37: No), the wireless terminal 210 increments the counter T by "1" (Step S38). Then, the wireless terminal 210 checks whether the reading of the counter T after the increment has got to the time span for a shift of listen interval T1 registered in advance or not (Step S39). If the counter T has not got to the time span for a shift of listen interval T1, the wireless terminal 210 returns to Step S36, where it keeps on monitoring the timer of the counter T.

If, on the other hand, the counter T has got to the time span for a shift of listen interval T1, the wireless terminal 210 checks whether the current listen interval is the maximum value or not. If the current listen interval has not got to the maximum value (Step S40: No), the wireless terminal 210 adds the increment value a registered in advance to the current listen interval (Step S41). In this way, the listen interval is updated so as to become longer by the increment value a when the time span T1 has elapsed from a data transmission. The wireless terminal 210 monitors the timer of the counter T, operating to restore from a doze state in the listen interval after the update (Step S36).

If the listen interval when the counter T gets to the time span for a shift of listen interval T1 is the maximum value (Step S40: Yes), the subsequent listen interval is held to the maximum value. Then, the wireless terminal 210 monitors the timer of the counter T, operating to restore from a doze state in the listen interval of the maximum value (Step S36).

An example of the above-described operation will be described below by referring to FIG. 10. The upper part of the drawing shows the beacon transmission intervals at the access point 220. In this example, a beacon is transmitted at every 100 ms. The lower part of the drawing shows how power consumption changes in a doze state, at a beacon reception time or at a data transmission time at the wireless terminal 210 in a power management mode.

As power is supplied to the wireless terminal 210, the wireless terminal 210 gets back from a doze state in the listen interval of the initial value (LI=LI0) and receives a beacon. Thereafter, as the wireless terminal 210 operates for a data transmission to the access point 220 at clock time t1, the listen interval is updated from the initial value to the minimum value (LI=LImin). In this example, assume that 100 ms that is equal to the beacon transmission interval is registered as minimum value of listen interval. After updating the listen interval, the wireless terminal 210 restores from a doze state in the interval of the minimum value of 100 ms to receive each and every beacon signal from the access point 220.

Assume here that subsequently the wireless terminal 210 operates once again for a data transmission at clock time t2 that comes before the time span T1 elapses from clock time t1. Then, as a result, the beacon listen interval of the wireless terminal 210 is continuously held to the minimum value of 100 ms (LI=LImin).

After clock time t2, the wireless terminal 210 operates to get back from a doze state at intervals of 100 ms and detects at clock time t3 that the time span T1 has elapsed since clock time t2 without any data transmission. As a result, the wireless terminal 210 applies the value obtained by adding the increment value a to the current listen interval, or 100 ms, as the updated listen interval (LI=LImin+α).

Thereafter, the increment value α is added to the current listen interval to update the current listen interval each time the time span T1 has elapsed until a data transmission occurs. Once the listen interval gets to the maximum value, the maximum value is maintained thereafter.

In this way, this embodiment dynamically changes the beacon listen interval of the wireless terminal 210 according to the time elapsed since a data transmission by the wireless terminal 210. Thus, the wireless terminal 210 can prevent any delay of data reception, while maintaining the power saving effect.

Embodiments of the present invention are not limited to those described above, which can be altered and modified within the scope of the appended claims. For example, in the above embodiments, a counter T that is incremented by a unit of minimum value of listen interval is used for measurements with regard to the time elapsed since a data transmission from the wireless terminal 210. Some other value may alternatively be used for the unit of measurement.

The wireless communication device of the present embodiment can be constituted with dedicated ICs or devices. However, the present embodiment can be embodied as a computer program that accommodate the operation of the wireless terminal (210) and a recording medium storing such a program.

While the present invention is described above by way of representative embodiments, the present invention can be carried out by embodiments of various other forms that do not depart from the spirit and the principal characteristics of the present invention. Therefore, the above-described embodiments (and examples) are simply for exemplary illustrations of the present invention and the present invention is not limited by the description of the specification and that of the abstract but is limited only by the appended claims. All those alterations and modifications that are made within the scope of the appended claims are to be understood so as to be within the scope of the present invention.

The whole or part of the exemplary embodiments disclosed above can be described as, but not limited to, the following supplement notes.

(Supplementary Note 1) A wireless communication method of a wireless communication device to which a power management mode of a wireless LAN is applied and to which a parent device communicates, the method comprises:

updating a listen interval of receiving a beacon signal from a parent device to be shorter than a current listen interval in response to a data transmission to the parent device; and periodically increasing the updated listen interval between the time span from the data transmission to a next data transmission, wherein reception of the beacon signal is carried out after switching from a doze state to an awake state.

(Supplementary Note 2) The wireless communication method according to Supplementary note 1, wherein the wireless communication device stores an information table defining three or more levels of interval of receiving the beacon signal from the parent device after switching from the doze state to the awake state;

updates the current listen interval to the shorter listen interval according to the information table in response to the data transmission to the parent device; and periodically increases the updated listen interval to follow the levels of the information table.

(Supplementary Note 3) The wireless communication method according to Supplementary note 2, comprising:

updating the current listen interval to the shorter listen interval according to the information table in response to the data reception from the parent device: and periodically increasing the updated listen interval to follow the levels of the information table.

(Supplementary Note 4) The wireless communication method according to Supplementary note 2, wherein the updated listen interval corresponds to the minimum level in the information table.

(Supplementary Note 5) The wireless communication method according to Supplementary note 2, wherein the information table has the three or more levels according to the time elapsed since the data transmission to the parent device.

(Supplementary Note 6) The wireless communication method according to Supplementary note 5, comprising:

detecting the timings of transmission of beacon signals by the parent device to count the total number of times of detections;

reducing the value of the total number at each data transmission to the parent device;

recognizing the revised value of the total number after the reduction as the elapsed time; and recognizing the listen interval of the level corresponding to the recognized elapsed time as the updated listen interval.

(Supplementary Note 7) The wireless communication method according to Supplementary note 1, wherein the wireless communication device updates the interval of receiving the beacon signal from the parent device after switching from the doze state to the awake state, to a value not greater than the beacon transmission interval of the parent device in response to the data transmission to the parent device; and
   incrementes the interval of receiving the beacon signal by a defined value each time when a defined time passes between the time span from the data transmission to the next data transmission.

(Supplementary note 8) The wireless communication method according to Supplementary Note 7, wherein, when the incremented listen interval gets to the defined maximum value, the maximum value is maintained as listen interval until the next data transmission takes place.

(Supplementary Note 9) The wireless communication method according to Supplementary note 7, wherein the elapse of the defined time is measured by means of a timer whose operation is completed by a unit of value not greater than the beacon signal transmission interval.

(Supplementary Note 10) The wireless communication method according to Supplementary note 7, wherein the listen interval updated to a value not greater than the beacon transmission interval of the parent device is 100 ms.

(Supplementary Note 11) A wireless communication device, comprising:
   a communication section that conducts wireless communications with a parent device of a wireless LAN in a power management mode; and
   a communication control section that stores an information table defining three or more levels of interval of receiving a beacon signal from the parent device after switching from a doze state to an awake state, updates the current listen interval to a shorter listen interval according to the information table in response to a data transmission to the parent device and periodically increases the updated listen interval to follow the levels of the information table.

(Supplementary Note 12) The wireless communication device according to Supplementary note 11, wherein the communication control section updates the current listen interval to a shorter listen interval according to the information table in response to a data reception from the parent device and periodically increases the updated listen interval to follow the levels of the information level.

(Supplementary Note 13) The wireless communication device according to Supplementary note 11, wherein the updated listen interval corresponds to the minimum level in the information table.

(Supplementary Note 14) The wireless communication device according to Supplementary note 11, wherein the information table has the three or more levels according to the time elapsed since the data transmission to the parent device.

(Supplementary Note 15) The wireless communication device according to Supplementary note 14, wherein the communication control section detects the timings of transmission of beacon signals by the parent device to count the total number of times of detections, reduces the value of the total number at each data transmission to the parent device, recognizes the revised value of the total number after the reduction as the elapsed time and recognizes the listen interval of the level corresponding to the recognized elapsed time as the updated listen interval.

(Supplementary Note 16) A wireless communication device, comprising:
   a communication section that conducts wireless communications with a parent device of a wireless LAN in a power management mode; and
   a control section that updates the interval of receiving a beacon signal from the parent device after switching from a doze state to an awake state to a value not greater than the beacon transmission interval of the parent device in response to a data transmission to the parent device and increments the interval of receiving a beacon signal by a defined value each time when a defined time passes between the time span from the data transmission to a next data transmission.

(Supplementary Note 17) The wireless communication device according to Supplementary note 16, wherein, when the incremented listen interval gets to the defined maximum value, the control section maintains the maximum value as listen interval until the next data transmission takes place.

(Supplementary Note 18) The wireless communication device according to Supplementary note 16, wherein the control section measures the elapse of the defined time by means of a timer whose operation is completed by a unit of value not greater than the beacon signal transmission interval.

(Supplementary Note 19) The wireless communication device according to Supplementary note 16, wherein the listen interval updated to a value not greater than the beacon transmission interval of the parent device is 100 ms.

(Supplementary note 20) A computer readable information recording medium storing a program causing a computer to operate as the wireless communication device according to Supplementary note 11.

(Supplementary Note 21) A computer readable information recording medium storing a program causing a computer to operate as the wireless communication device according to Supplementary note 16.

{Industrial Applicability}

While the present invention can find suitable applications in the field of battery-driven potable terminals provided with a wireless LAN function, it is not limited to portable terminals and is also applicable to other devices provided with a wireless LAN function that are expected to provide a power saving effect.

{Reference Signs List}
110: portable terminal
111: communication bus
120: STA (wireless LAN card)
121: transmission section
122: reception section
123: communication control section
124: antenna
130: AP
1000: wireless LAN system
210: wireless terminal
211: wireless LAN module
212: communication section
213: control section
220: access point
230: server
240: wired LAN

The invention claimed is:
1. A wireless communication method of a wireless communication device to which a power management mode of a wireless LAN is applied and to which a parent device communicates, the method comprises:

updating a listen interval of receiving a beacon signal from a parent device to be shorter than a current listen interval in response to a data transmission to the parent device; and periodically increasing the updated listen interval between the time span from the data transmission to a next data transmission, wherein reception of the beacon signal is carried out after switching from a doze state to an awake state, wherein the wireless communication device stores an information table defining three or more levels of interval of receiving the beacon signal from the parent device after switching from the doze state to the awake state;

updates the current listen interval to the shorter listen interval according to the information table in response to the data transmission to the parent device; and periodically increases the updated listen interval to follow the levels of the information table, and wherein the information table has the three or more levels according to the time elapsed since the data transmission to the parent device, the method further comprising:

detecting the timings of transmission of beacon signals by the parent device to count the total number of times of detections;

reducing the value of the total number at each data transmission to the parent device;

recognizing the revised value of the total number after the reduction as the elapsed time; and recognizing the revised listen interval of the level corresponding to the recognized elapsed time as the updated listen interval.

2. The wireless communication method according to claim 1, comprising:

updating the current listen interval to the shorter listen interval according to the information table in response to the data reception from the parent device: and periodically increasing the updated listen interval to follow the levels of the information table.

3. The wireless communication method according to claim 1, wherein the updated listen interval corresponds to the minimum level in the information table.

4. The wireless communication method according to claim 1, wherein the wireless communication device updates the interval of receiving the beacon signal from the parent device after switching from the doze state to the awake state, to a value not greater than the beacon transmission interval of the parent device in response to the data transmission to the parent device; and increments the interval of receiving the beacon signal by a defined value each time when a defined time passes between the time span from the data transmission to the next data transmission.

5. The wireless communication method according to claim 4, wherein, when the incremented listen interval gets to the defined maximum value, the maximum value is maintained as listen interval until the next data transmission takes place.

6. The wireless communication method according to claim 4, wherein the elapse of the defined time is measured by means of a timer whose operation is completed by a unit of value not greater than the beacon signal transmission interval.

7. A wireless communication device, comprising:

a communication section that conducts wireless communications with a parent device of a wireless LAN in a power management mode; and a communication control section that stores an information table defining three or more levels of interval of receiving a beacon signal from the parent device after switching from a doze state to an awake state, updates the current listen interval to a shorter listen interval according to the information table in response to a data transmission to the parent device and periodically increases the updated listen interval to follow the levels of the information table, wherein the information table has three or more levels according to the time elapsed since the data transmission to the parent device, and wherein the communication control section detects the timings of transmission beacon signals by the parent device to count the total number of time detections, reduces the value of the total number at each data transmission to the parent device, recognizes the revised value of the total number after the reduction as the elapsed time and recognizes the listen interval of the level corresponding to the recognized elapsed time as the updated listen interval.

8. The wireless communication device according to claim 7, wherein the communication control section updates the current listen interval to a shorter listen interval according to the information table in response to a data reception from the parent device and periodically increases the updated listen interval to follow the levels of the information level.

9. The wireless communication device according to claim 7, wherein the updated listen interval corresponds to the minimum level in the information table.

10. The wireless communication device according to claim 7, wherein when the increased listen interval gets to the defined maximum value, the control section maintains the maximum value as the listen interval until the next data transmission takes place.

11. The wireless communication device according to claim 7, wherein the control communication section measures the elapse of the defined time by means of a timer whose operation is completed by a unit of value not greater than the beacon signal transmission interval.

* * * * *

UNITED STATES PATENT AND TRADEMARK OFFICE
CERTIFICATE OF CORRECTION

Page 1 of 1

PATENT NO. : 8,477,670 B2
APPLICATION NO. : 12/718728
DATED : July 2, 2013
INVENTOR(S) : Haruhiko Sumida and Teruo Kawahara It is certified that error appears in the above-identified patent and that said Letters Patent is hereby corrected as shown below:

In the Specification

Column 9, Line 42: Delete "a" and insert -- α --

Signed and Sealed this
Twenty-eighth Day of October, 2014

Michelle K. Lee
*Deputy Director of the United States Patent and Trademark Office*